3,090,793
CURING OF EPOXY RESINS
James S. Casement, St. Paul, Minn., assignor to Minnesota Mining and Manufacturing Company, St. Paul, Minn., a corporation of Delaware
No Drawing. Filed Nov. 28, 1958, Ser. No. 776,724
6 Claims. (Cl. 260—399)

The invention relates to the curing of epoxy resins and to the novel cured resinous products obtained thereby, and has particular reference to novel co-reactants employed therein.

Numerous co-reactants for curing epoxy resins are available and others have been proposed. Some of these materials provide cured resins of good flexibility, toughness and resistance to mechanical and thermal shock, but which are deficient in electrical properties. Others provide improved dissipation factor, dielectric constant, and other electrical properties, but are less effective in other respects. Some are difficult to incorporate with the epoxy resin, or are not adequately reactive, or react with liberation of excessive amounts of heat, or have other disadvantages.

The present invention overcomes these deficiencies of prior art co-reactants for epoxy resins. There is provided a novel class of co-reactants which are easily mixed or blended with the epoxy resin, which are readily and rapidly reactive with the resin without excessive exotherm, and which, when thus mixed and reacted form cured epoxy resin articles which are flexible and tough, show superior dissipation factor and dielectric constant, and retain these properties in the presence of moisture.

The epoxy resin co-reactants of this invention which possess the above-described properties are polymercapto-alkyl esters of polycarboxylic acids containing at least 18 carbon atoms. These polymercaptans may be prepared by reacting mercapto-alcohols containing up to 10 carbon atoms with the appropriate polycarboxylic acids.

The preferred high molecular weight polycarboxylic acids are those commonly referred to as polymeric fat acids because of their availability in large quantities. Also, these acids are prepared by polymerizing unsaturated fatty acids, or derivatives thereof, which are abundantly available at a low price. Illustrative sources of these acids are tall oil, soybean oil, linseed oil, cottonseed oil, tung oil, dehydrated castor oil, sunflower oil, safflower oil, and other fats and oils containing unsaturated fatty acids. An economical source of these acids is tall oil at the present time, and therefore, it can be expected that the product derived therefrom will, or may, contain rosin acids or dimerized rosin acids. In any case, it is thought that the unsaturated fatty acids react at the situs of their unsaturation to polymerize to dimers, trimers, etc. The term "polymeric fat acid" is designed to encompass mixtures of these polycarboxylic acids which also may contain some monocarboxylic acids, as well as the individual polycarboxylic acids. Illustrative patents showing the preparation of these acids are U.S. Patent Nos. 2,482,761, 2,793,219 and 2,793,220.

Polycarboxylic acids useful in this invention to prepare the long chain polymercaptans may also be prepared by reacting an excess of a polycarboxylic acid with a glycol. Ethylene glycol is preferred although it is contemplated that other polyhydric alcohols may also be employed. Here again, as with the acids themselves, the preferred polycarboxylic acids to be employed in this fashion are the polymeric fat acids.

As employed in this specification, the term "epoxy resin" relates to poly-epoxide compounds which contain reactive vicinal epoxy linkages available as reaction sites. One type of epoxy resin which has enjoyed a high degree of commercial success are those resins prepared from epichlorohydrin and polyhydric phenols, such as 2,2'-bis-(p-hydroxy phenyl) propane, resorcinol, and polyhydric novolak. A second class of epoxy resins are those prepared from polyhydric alcohols such as glycerin and pentaerythritol and epichlorohydrin. Another class of epoxy resins are those prepared from epichlorohydrin and amines containing reactive hydrogen atoms. A still further class of epoxy resins are those prepared by the direct epoxidation of aliphatic or aromatic unsaturated compounds. These resins and compositions containing these resins are classified by the Patent Office in Class 260, sub-classes 2, 42, 47, and 348, and reference thereto may be had for the early patents as well as the most recent patent publications on current developments in this field. Throughout these sub-classes are described various products and their method of preparation and these resins are useful in the practice of this invention. The preferred compositions of this invention are those directed to the new and useful coreactants with the above-defined classes of epoxy resin, and mixtures thereof. Because the above-mentioned classes of compounds are currently enjoying greater and greater commercial success, it is recognized that other epoxy resins containing an average vicinal epoxy group content of more than 1 will be developed that are useful in the practice of this invention. As with those epoxy resins, presently available, the preferred compounds are those containing more than 1 and less than 3 vicinal epoxy group per molecule and mixtures containing a preponderance of these compounds.

The ratio of polymercaptan to epoxy resin may be varied over a broad range depending on the desired properties of the final cured product. If a highly flexible final product is desired, a high proportion of polymercaptan should be employed. One reaction that takes place during the curing stage is for the mercaptan group to react with the epoxide group. It has, however, been discovered that those compositions containing 2 to 5 oxirane groups per mercaptan group produce compositions which are superior for many applications, especially when employed in combination with liquid epoxy resins, the preferred resins, in potting and casting applications.

In order to accelerate the reaction between the mercaptan groups and the epoxy groups, it is desirable to introduce a catalyst to the system. Illustrative catalysts are 2,4,6 tris (dimethyl-amino methyl) phenol and triphenyl phosphine. Alkali metal hydroxides such as sodium and potassium hydroxide, aluminum alcoholates, zinc and lead octoates and naphthenates, boron trifluoride complexes, primary and secondary amines and acids such as phosphoric acid may also be useful. Especially useful in this reaction are the tertiary amines, and they are the preferred class of catalysts.

It may also be desirable to add a filler to the compositions of this invention. Among those fillers useful in the practice of this invention are talc, silica, alumina, steel chips, steel filings, aluminum flake, calcium carbonate, thixotropic agents, fibrous fillers such as asbestos and chopped glass, and various other fillers commonly employed in combination with epoxy resins.

This invention may be illustrated further by reference to the following examples in which all "parts" are expressed as parts by weight and all "percentages" are expressed as percent by weight, unless specified otherwise.

EXAMPLE I

Ethylene glycol (26 lbs., 0.42 mol) and polymeric fat acids (880 lbs., 2.96 acid equiv.) prepared by polymerizing $C_{18}$ unsaturated fatty acids and having the following characteristics:

| | |
|---|---|
| Acid value (mg. KOH/gm.) | 180. |
| Saponification value (mg. KOH/gm.) | 185. |
| Unsaponifiables | 2.0% (less than). |
| Neutralization equivalent | 300. |
| Dimer content, $C_{36}$ | 75%. |
| Trimer content, $C_{54}$ | 22%. |
| Monomer content | 3%. |
| Specific gravity at 15.5° C./15.5° C. | 0.95. |
| Viscosity at 25° C. | 10,000 cps. (approximately). | were charged to a 750 gallon kettle along with p-toluene sulfonic acid (5 lbs.) and benzene (175 lbs.) and heated under vacuum by gradually raising the temperature to 240° F. for about 2.5 hours, during which time about 15 lbs. of water were removed. The liquid was then cooled to 100° F., and to it was added beta-mercapto-ethanol (197 lbs., 2.5 mols). Heating was resumed under nitrogen by gradually raising the temperature to 245° F. and about 51 lbs. of water and volatile water-soluble materials were removed in about 3.5 hours. The material was then stripped at up to 300° F. at 15 mm. Hg and cooled under nitrogen to 85° F.

The resulting polymercaptan product was a liquid having the following properties:

Nonvolatiles after 24 hrs. vacuum at 150° F.
percent__ 99.0
Viscosity at 25° C. _____cps__ 780
—SH by oxidation with iodine in $CCl_4$___percent__ 6.8

EXAMPLE II

An epoxy resin (168 parts) prepared from resorcinol and epichlorohydrin and having an epoxide equivalent weight of about 150, i.e., containing one mol-weight of oxirane oxygen in about 150 parts by weight of the resin, 8 parts of a dispersion of 12% red iron oxide by weight in a liquid bis-phenol A-epichlorohydrin epoxy resin having an epoxide equivalent weight of about 190, and talc (24 parts) were mixed and labelled Reactant A.

The reaction product of Example I (140 parts) was mixed with 2,4,6, tris(dimethyl-amino methyl)phenol (20 parts) and talc (40 parts) and labelled Reactant B.

Reactants A and B when mixed together in equal parts by weight, cured exothermically to a tough, resilient solid. The "gel time" for the mixture at 140° F. was 8.3 minutes for a 20 gram sample.

EXAMPLE III

A reaction mixture containing the polymercaptan product of Example I (57 parts), an epoxy resin (60 parts) derived from resorcinol and epichlorohydrin and having an epoxide equivalent weight of about 150, 2,4,6, tris (dimethyl amino methyl) phenol (7.5 parts) and bis-(mercaptoethyl) ether (1.8 parts) was prepared. This reaction mixture had a gel time at 25° C. ambient of about 7 minutes in a three fluid ounce quantity with a peak temperature of 310° F. at the center. When cast in a 2″ x 2″ x ⅜″ sample and placed on a steel anvil, it withstood twelve drops of a 3¾″ diameter, 7.8 lb. steel ball, from a height of three feet (about 23 ft. lbs. per drop). Its electrical properties were as follows:

| Temperature | 25° C. | | 68° C. | |
|---|---|---|---|---|
| Dielectric constant (k) | 4.6 | 4.5 | 6.2 | 6.4 |
| Dissipation Factor (D) | .02 | .01 | .07 | .01 |
| Frequency (cycles/sec.) | 50 | 1,000 | 50 | 1,000 |

This data shows that the compositions are more than acceptable for most electrical insulation applications at room temperature and at an elevated temperature.

EXAMPLE IV

A 5-liter glass flask was charged with polymeric fat acids (3430 gms., 11.5 acid equivalent), ethylene glycol (155 gms., 2.5 mols), and p-toluene sulfonic acid (20.4 gms.).

The mixture was reacted at about 100° C. for six hours and approximately sixty grams of water at about 25 mm. Hg were removed from the flask.

Beta-mercapto-ethanol (600 gms., 7.7 mols) was then added, and the reaction was continued at about 65° C. for another ten hours, under about 20-30 mm. Hg and with the removal of about 55 cc. water. The product was stripped at 110° C. and 20 to 30 mm. Hg for an additional four hours to remove additional water (32 cc.).

The product was a liquid having the following properties:

Viscosity at 25° C. _____cps__ 2500
—SH by iodine oxidation_____percent__ 4.5

The resulting product was utilized in a series of formulations with an epoxy resin derived from resorcinol and epichlorohydrin and having an epoxide equivalent weight of about 150, and 2,4,6, tris (dimethyl-amino methyl) phenol in various amounts and the time to gelation in 8 dram vials was observed as shown in Table I.

Table I

| Formulation | Ratio oxirane to —SH groups (calc.) | Polymer-captan (percent by weight) | Epoxy resin (percent by weight) | Tertiary amine catalyst (percent by weight) | Gel time (minutes) |
|---|---|---|---|---|---|
| 1 | 4:1 | 52.6 | 40.4 | 7.0 | 31 |
| 2 | 5:1 | 47.5 | 45.5 | 7.0 | 29 |
| 3 | 6:1 | 43.3 | 49.7 | 7.0 | 23 |
| 4 | 7:1 | 39.7 | 53.3 | 7.0 | 21 |
| 5 | 9:1 | 34.2 | 58.8 | 7.0 | 19 |
| 6 | | 0 | 93.0 | 7.0 | [1] 38 |

[1] Thickened rapidly but had little exotherm and slow gel.

EXAMPLE V

The product of Example IV (57.7 grams) was mixed with an epoxy resin (59.2 gms.) derived from resorcinol and epichlorohydrin and having an epoxide equivalent weight of about 150, and 2,4,6, tris (dimethyl-amino methyl) phenol (8.3 gms.).

The mixture reacted exothermically and gelled in 13 minutes at room temperature ambient in a three fluid ounce cup, with a peak temperature of 275° F. at the center of the mass. A 2″ x 2″ x ½″ piece resting on a steel anvil resisted nineteen 3 ft. drops of the 7.8 lbs. steel ball.

Another sample was allowed to cure in ⅝″ thick by 2″ diameter patties with ordinary ½″ hexagonal machine nuts embedded in the center of the patties and having the threaded hole of the nut concentric along the vertical axis of the patty and the bottom surface of the nut exposed in the bottom surface of the patty. Three of these patties were placed in an alcohol-Dry-Ice bath, and the temperature of the bath lowered in steps of 5° C. at intervals of ten minutes. The temperature at which cracking occurs indicates the lowest temperature at which the material may be used in the encapsulation of metallic parts such as transformer cores, etc. One patty cracked at −40° C., one at −45° C., and one at −70° C. Obviously, these low temperatures show that these compositions are more than satisfactory for any normal type of application.

A third sample, a ⅛″ thick casting, was tested in an electric test in which the dissipation factor and dielectric constant are measured at an elevated temperature while the sample is exposed to water on one side for extended times. This test shows the behavior of the material as a dielectric when exposed to hot and wet conditions.

The values obtained on the casting at a frequency of 50 cycles per second (c.p.s.) were as follows:

| Temperature (°C.) | 25 | 60 | 60 | 60 | 60 | 60 | 60 |
|---|---|---|---|---|---|---|---|
| Condition | Dry | Dry | Wet | Wet | Wet | Wet | Wet |
| Time (hours) | Zero | Zero | 0.5 | 1.0 | 2.0 | 18.5 | 20.8 |
| Dissipation factor (D) | 0.009 | .037 | .026 | .042 | .044 | .039 | .040 |
| Dielectric constant (k) | 5.4 | 6.5 | 6.9 | 7.2 | 7.3 | 9.4 | 9.8 |

EXAMPLE VI

To a glass 2000 ml. reaction flask fitted with a packed column fractionating condenser with vacuum attachment, a heater, and equipment to allow a nitrogen bubble purge, was added beta-mercapto ethanol (345 gms., 5.0 mols), p-toluene sulfonic acid (8 gms.) and polymeric fat acids (1212 gms., 4.0 acid equivalent) having the following characteristics:

| | |
|---|---|
| Acid value | 185. |
| Saponification value | 195. |
| Color | Dark. |
| Neutralization equivalent | 300. |
| Refractive index at 60° C. | 1.4830. |
| Specific gravity at 29° C. | 0.959. |
| Flash point | 595° F. |
| Fire point | 680° F. |
| Trimer content | 70% (approximately). |
| Dimer content | 30%. |
| Pour point | 55° F. |
| Solubility | Partially soluble in mineral spirits. Soluble in alcohol, ketones and ethers. |
| Viscosity at 25° C. | >100,000 cps. |

The flask was heated to about 165° C. in a nitrogen bubble purge for 11 hours at a pot pressure of about 130 mm. Hg. The product was then stripped at about 3 mm. Hg pressure. Xylol was added and the stripping operation repeated to remove the last traces of mercapto-ethanol. The resulting product was a brown liquid having the following properties:

Viscosity, 25° C. _____ cps__ 2580
—SH by iodine oxidation _____ percent__ 7.6

EXAMPLE VII

The reaction product of Example VI (41.8 parts) was mixed with an epoxy resin (42.8 parts) derived from resorcinol and epichlorohydrin and having an epoxide equivalent weight of about 150 and 2,4,6, tris (dimethyl-amino methyl) phenol (6.0 parts).

When initially stirred together, a cloudy, non-homogenous mixture was obtained. The cloudiness disappeared, however, in about one minute, with stirring, and a clear liquid resulted. The mixture was poured into a 3 fluid ounce container at 25° C. ambient in which it exothermed smoothly and gelled in about 5½ minutes. The final product was a very shock-resistant, tough resin.

EXAMPLE VIII

The product of Example VI (45 parts) was incorporated in a formulation containing an epoxy resin derived from resorcinol and epichlorohydrin and having an epoxide equivalent weight of about 150 (55 parts), 2,4,6, tris(dimethyl-amino methyl) phenol (6 parts), diethylene triamine (2 parts), bis(mercaptoethyl) ether (2 parts) and 10 parts of finely divided silica flour.

A one-inch size steel pipe was placed in a −5° C. temperature area for one-half hour and when the initial exothermic heat of the above mixture was observed (about 6 minutes) it was brought out to the −5° C. area and spread over a 3-inch length of the cold pipe in about a ¼″ thick layer. After forty-five minutes at the −5° C. temperature, the resin layer was observed to have solidified to a substantially strong state which demonstrates the usefulness of these compositions at low ambient temperatures.

EXAMPLE IX

A product having the following properties:

Viscosity at 25° C. _____ cps__ 1300
—SH by iodine oxidation _____ percent__ 8.6 was prepared from the ingredients of Example VI according to the procedure of Example VI.

This reaction product (14 parts) was mixed with an epoxy resin (15 parts) derived from resorcinol and epichlorohydrin and having an epoxide equivalent weight of about 150, and 2,4,6 tris (dimethyl-amino methyl) phenol (2 parts). This mixture exothermed smoothly at 25° C. ambient and gelled in a short time. A ⅛″ thick patty was fitted with foil electrodes, and the following electrical properties were observed:

| Temperature (°C.) | 25 | 25 | 56 | 56 |
|---|---|---|---|---|
| Frequency (cycles/sec.) | 50 | 1,000 | 50 | 1,000 |
| Dissipation Factor (D) | .012 | .008 | .105 | .043 |
| Dielectric Constant (k) | 4.40 | 4.31 | 6.04 | 5.55 |

EXAMPLE X

Into a one liter, 3 neck polymer flask equipped with a stirrer, thermometer, Barrett trap and 8″ packed column was charged the following materials:

Polymeric fat acids _____ 300 gms. (1.0 equivalent).
Beta-mercapto ethanol _____ 86 gms. (1.1 moles).
p-Toluene sulfonic acid ____ 0.5 gms.

The mixture was heated slowly to 120° C. in one hour, the column temperature being 100° C., at which point 10 ml. of distillate was collected in the trap. The pot temperature was raised to 130° C. for one more hour. The pot temperature was then increased to 160° C., and a vacuum applied to strip off unreacted mercapto-ethanol and any remaining water. The product was a brown liquid weighing 346 grams having a mercaptan content of 7.0%.

The resulting product was mixed with an epoxy resin derived from resorcinol and epichlorohydrin and having an epoxide equivalent weight of about 150, and 2,4,6 tris (dimethyl-amino methyl) phenol in various amounts and the time to begin sensible exotherm and the time to gelation in 8 dram vials observed as shown in Table II:

*Table II*

| Formulation | Ratio of oxirane to mercaptan groups | Epoxy resin [1] | Example X product [1] | Tertiary amine [1] | Time to exotherm (mins.) | Time to gel (mins.) |
|---|---|---|---|---|---|---|
| A | 1.0 | 21.8 | 72.5 | 5.7 | >90 | >90 |
| B | 2.0 | 35.6 | 59.2 | 5.7 | 55 | 75 |
| C | 3.0 | 44.8 | 49.5 | 5.7 | 25 | 40 |
| D | 3.5 | 47.4 | 46.9 | 5.7 | 13.5 | 30 |
| E | 4.0 | 51.5 | 42.8 | 5.7 | 10 | 20 |
| F | 4.5 | 53.9 | 40.4 | 5.7 | 10 | 24 |
| G | 5.0 | 56.6 | 37.7 | 5.7 | 30 | >80 |

[1] Percent by weight of the three component system.

Formulations D and F were spread on glass, and the films gelled within 45 minutes to give tough, clear coatings with strong adhesion to the glass surface.

EXAMPLE XI

The product of Example IX (14 parts), an epoxy resin (15 parts) derived from resorcinol and epichlorohydrin and having an epoxide equivalent weight of about 150, triphenyl phosphine (1⅓ parts) and 2,4,6, tris (dimethyl-amino methyl) phenol (0.5 part) formed a mixture which gelled within minutes with some exotherm at room temperature ambient to a tough shock-resistant solid.

EXAMPLE XII

A product prepared from the same ingredients and the same manner as the product of Example VI had the following properties:

Viscosity _____ 1900 cps. at 25° C.
—SH content by iodine
  oxidation _____ 8.0%.

Upon mixing this product (41.4 parts) with a liquid epoxy resin (60 parts), derived from bisphenol-A and epichlorohydrin and having an epoxide equivalent weight of about 190 and a viscosity of about 1600 cps. at room temperature, and 2,4,6 tris (dimethyl-amino methyl) phenol (7.0 parts) resulted in a mixture which gelled in an 8 dram vial at room temperature ambient in about 27 minutes with noticeable exothermic heat developed, to give a tough solid resin.

A second mixture was prepared which contained 41.4 parts of the polymercaptan of this example, 40 parts of a fluid (about 100–150 cps.) epoxy resin derived from aniline and epichlorohydrin, having an epoxide equivalent weight of about 125 and 2,4,6, tris (dimethyl-amino methyl) phenol (7.0 parts). In an 8 dram vial, this mixture gelled in about 1¾ hours (105 minutes) with some exotherm, at room temperature ambient, and showed no cloudiness or incompatibility at any time.

A third mixture was made containing 41.4 parts of the polymercaptan of this Example, 54 parts of a viscous (ca. 270,000 cps.) liquid epoxy resin from a polyolefinic long chain material by epoxidation with hydrogen peroxide and having an epoxide equivalent weight of about 180 gms., and 7.0 parts of 2,4,6, tris (dimethyl-amino methyl) phenol. The mixture showed no incompatibility and was relatively unreactive at room temperature. At 250° F. a patty of it gelled in about 45 minutes. After 64 hours at 250° F., the Shore A-2 hardness measured at room temperature was about 76.

A fourth mixture was formulated from the polymercaptan (61 parts) of this example, 3,4 epoxy 6-methyl cyclohexylmethyl 3,4 epoxy 6-methyl cyclohexanecarboxylate (25 parts) and 2,4,6, tris (dimethyl-amino methyl) phenol (3 parts). This mixture was clear and showed no incompatibility. At room temperature, it was relatively inactive. The room temperature viscosity was 1850 cps. and after 18 days at 25° C., it was 2900 cps. After 20 hours at 120° C., a patty of the above mixture on an aluminum foil was found to have a Shore A-2 hardness of 28 at room temperature. There was good adhesion to the aluminum foil.

A fifth mixture was prepared containing 41.3 parts of the polymercaptan of this example, and 14 parts of an epoxy resin derived from resorcinol and epichlorohydrin and having an epoxide equivalent weight of about 150. At 300° F., a patty of this material gelled in about 5 hours to a flexible solid resin.

A sixth mixture was prepared containing 25.0 grams of the polymercaptan of this example, 37.5 grams of an epoxy resin having an epoxide equivalent of about 210 prepared by reacting novolak with epichlorohydrin, and 3.0 grams of 2,4,6, tris (dimethyl-amino methyl)phenol. A 15 gram patty of this mixture exothermed and gel-cured in about 10 minutes at room temperature ambient. The patty was then baked in an oven at 250° F. which resulted in the preparation of a tough, semi-rigid plastic with good mechanical shock resistance and a Shore D durometer hardness of 75. A second mixture was prepared by mixing 30 grams of the polymercaptan, 20 grams of the epoxy resin and 1.5 grams of the tertiary amine catalyst. A 15 gram patty of this mixture gelled in about 30 minutes at room temperature ambient and was then cured at 250° F. to produce a flexible, resilient, tough plastic having a Shore D durometer hardness of 25.

EXAMPLE XIII

A glass polymer flask was fitted with a water-cooled condenser, thermometer, stirrer and heating mantle and charged with ethylene glycol (29 gms.), p-toluene sulfonic acid (4 gms.), and 709 gms. of a mixture of high molecular weight polybasic acids produced during the manufacture of sebacic acid. These acids had an average chain length of 50 carbon atoms, an acid number of about 142, an iodine number of about 55 and a viscosity of A+ to F on the Gardner-Holdt scale when measured as a 70% solution in toluene.

The mixture was heated to about 170° C. for about 3½ hours. At the end of this period, a vacuum was applied and about 14 ml. of $H_2O$ was collected. Next, beta-mercaptoethanol (86 gms.) was added to the reaction vessel. The reaction mixture was heated again, and condensate and other volatiles withdrawn, for about an additional 3½ hours. At this point, the pot temperature was 200° C., and about 26 ml. additional distillate had been withdrawn. The product at this point was sampled and found to have the following properties:

Viscosity at 25° C. _____ cps__ 5200
—SH by iodine oxidation _____ percent__ 1.2

In order to increase its mercaptan content, a second charge of beta-mercapto-ethanol (60 gms.) and para-toluene sulfonic acid (2.5 gms.) was added to 420 gms. of the above product. The reaction was run at about 90° C. for about 6½ hours, stripping unreacted material and condensate at the end. The product was a viscous brown liquid with the following properties:

Viscosity at 25° C. _____ About 50,000 cps.
—SH by iodine oxidation _____ 1.9%.

A mixture was prepared containing an epoxy resin derived from resorcinol and epichlorohydrin and having an epoxide equivalent weight of about 150 (59.2 gms.), 55.2 gms. of the above final reaction product, and 2,4,6, tris (dimethyl-amino methyl) phenol (8.3 gms.). This mixture gelled at room temperature ambient in an 8 dram vial with some exotherm developed, in 28 minutes, to form a tough, hard resin product. A patty gelled at room temperature had a Shore D hardness of 65.

I claim:

1. A mercaptan-containing polyester prepared by esterifying the hydroxyl group of a mercapto-alcohol containing less than 11 carbon atoms with the carboxyl groups of a polycarboxylic acid containing at least 18 carbon atoms.

2. A mercaptan-containing polyester prepared by esterifying the hydroxyl group of beta-mercapto-ethanol with the carboxyl groups of a polycarboxylic acid containing at least 18 carbon atoms.

3. A mercaptan-containing polyester prepared by esterifying the hydroxyl group of beta-mercapto-ethanol with the carboxyl groups of a polymeric fat acid.

4. A mercaptan-containing polyester prepared by esterifying the hydroxyl group of beta-mercapto-ethanol with the carboxyl groups of polymeric fat acids containing a preponderance of $C_{36}$ dicarboxylic acid.

5. A mercaptan-containing polyester prepared by esterifying the hydroxyl group of beta-mercapto-ethanol with the carboxyl groups of a polycarboxylic acid containing at least 18 carbon atoms, said polycarboxylic acid prepared by esterifying an excess of a polycarboxylic acid with a glycol.

6. A mercaptan-containing polyester prepared by esterifying the hydroxyl group of beta-mercapto-ethanol with the carboxyl groups of a polycarboxylic acid prepared by esterifying an excess of polymeric fat acids with ethylene glycol.

References Cited in the file of this patent

UNITED STATES PATENTS

| | | |
|---|---|---|
| 2,373,015 | Cowan | Apr. 3, 1945 |
| 2,429,219 | Cowan | Oct. 21, 1947 |
| 2,615,008 | Greenlee | Oct. 21, 1952 |
| 2,668,807 | Greenlee | Feb. 9, 1954 |
| 2,837,562 | Matuszak et al. | June 3, 1958 |
| 2,839,571 | Johnson et al. | June 17, 1958 |